EXTENSIBLE JOINT STRUCTURES
Original Filed Dec. 3, 1947
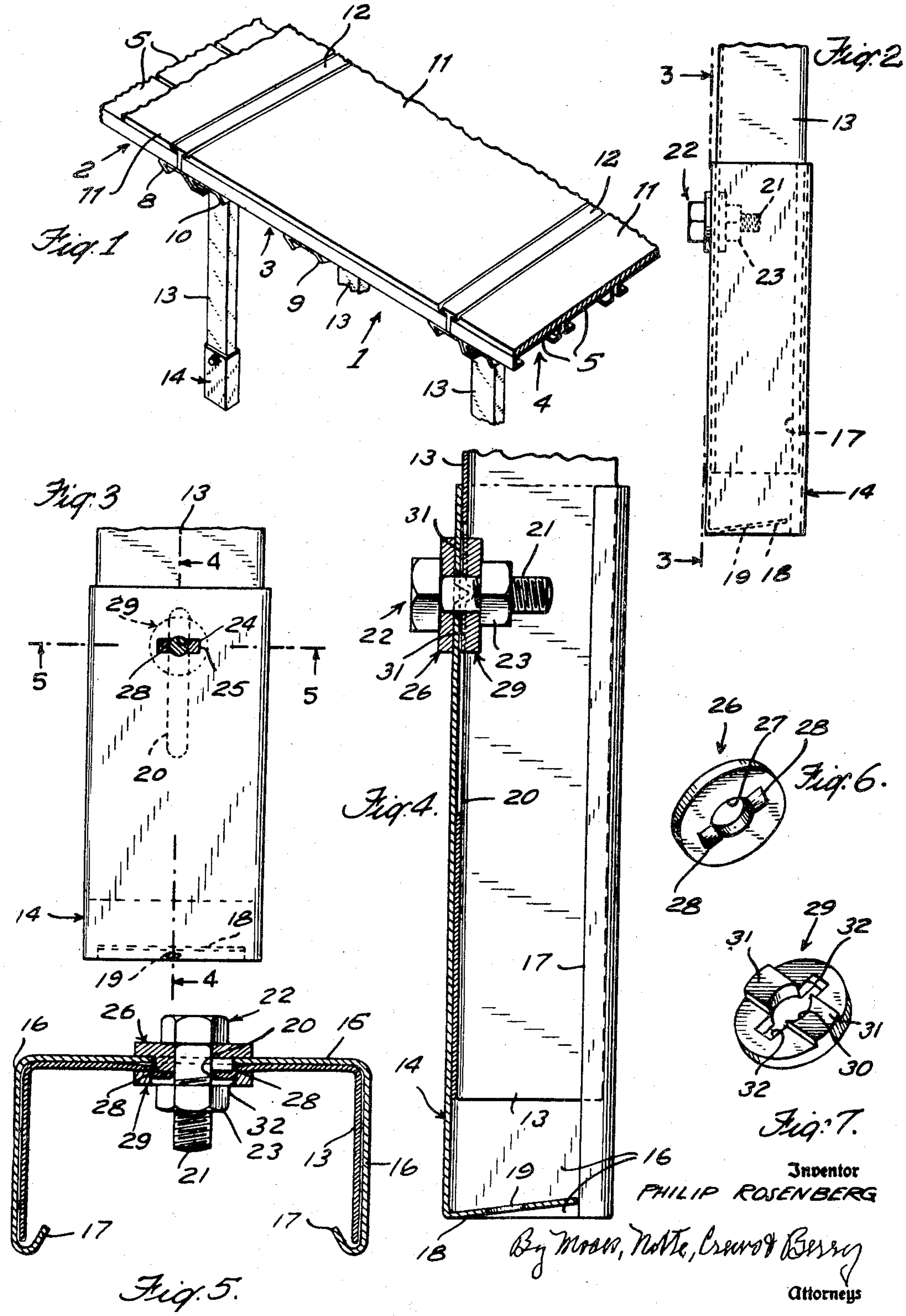
Inventor
PHILIP ROSENBERG
By Moore, Nolte, Crews & Berry
Attorneys United States Patent Office 2,777,247

Patented Jan. 15, 1957

2,777,247

EXTENSIBLE JOINT STRUCTURES

Philip Rosenberg, New York, N. Y., assignor to Universal Steel Equipment Corporation, Long Island City, N. Y., a corporation of New York Original application December 3, 1947, Serial No. 789,519, now Patent No. 2,639,789, dated May 26, 1953. Divided and this application January 28, 1953, Serial No. 333,629

4 Claims. (Cl. 45—139)

The present application is a division of my pending application, Serial No. 789,519, filed December 3, 1947, for Extensible Joint Structure, now Patent No. 2,639,789, granted May 26, 1953.

This invention relates to extensible joints, and more particularly to joints of table legs which are adjustable in length. While the utility of the invention is not confined to table legs of adjustable length the invention has been contrived with that use primarily in view and will therefore be illustratively shown and described herein in connection with such use.

In cutting room work and in many other commercial operations it is important to provide a long table composed of a plurailty of sections joined end to end. It is important that the top of the plural section table shall be continuously smooth and level, even though the floor of the room in which the table is situated may be sloping or of irregular contour.

It has been common practice heretofore to provide the table legs with adjustable shoes or lower sections so that the legs can be individually adjusted in length when the table is installed. A common expedient has been to provide an upper, channeled, sheet metal leg member and a lower, sheet metal shoe member into which the upper member is telescoped, one of said members being slotted and the other perforated, and to use a bolt and nut combination together with one or more lock washers for clamping the members together as securely as possible in adjusted relation.

A construction of the kind referred to has the disadvantage that the holding means acts in an impositive manner. When a porter drops a heavy bundle of material on the table there is apt to be a slight slipping of the leg and shoe relative to one another, and as time goes on one or more of the legs may come to be shortened substantially, so that the table top becomes objectionably uneven.

It is the primary object of the present invention to provide an extensible joint in which the drawback referred to is obviated.

To this end the upper leg member and shoe are provided as before, together with a bolt and nut combination. In addition, however, means are provided in association with the nut and bolt for effecting a positive interconnection of the parts capable of holding them in fixed relation to one another without the possibility of slipping.

For accomplishing this purpose a pair of die members of novel construction is provided. These members desirably take the form of washers. In accordance with the illustrative embodiment which forms the subject of the present application, one of the washers is formed with one or more projections or teeth which are adapted to be passed through perforations formed in one of the members to be joined, and to engage wall material of the second member to be joined alongside a slot formed therein. The second washer is formed with one or more recesses, into which the wall material of said second member may be displaced and fitted by deforming it beyond its elastic limit. The bolt is passed successively through the first washer, the first and second members to be joined and the second washer. The tightening of the nut on the bolt serves to effect the positive interlocking of the slotted member with the second washer. The bolt shank fixes the relation of the two washers and the first joint member to one another while the deformation of the wall material of the second joint member into the second washer positively locks the second joint member in fixed relation to the second washer, thereby securing the joint members positively in the desired adjusted relation to one another.

It is an important point that the leg members are not deformed into interlocking relation directly with one another. Should the table leg require readjustment, as it might if the table were moved to a new location, the backing off of the nut will cause the deformed leg material to be freed from the washer recess in which it is lodged. The parts can be freely readjusted and the nut can then be retightened to interlock the parts in the new relation.

Other objects and advantages will hereinafter appear.

In the drawing forming part of this specification,

Figure 1 is a fragmentary, perspective view of a sectional table having legs in which the invention is utilized;

Figure 2 is a fragmentary view in side elevation of table leg and shoe members, together with the parts for securing these members in fixed, adjusted relation to one another;

Figure 3 is a fragmentary view in sectional front elevation of the parts illustrated in Figure 2, the section being taken upon the line 3—3 of Figure 2, looking in the direction of the arrows;

Figure 4 is a fragmentary view in sectional elevation, upon a larger scale than the preceding figures, the section being taken upon the line 4—4 of Figure 3, looking in the direction of the arrows;

Figure 5 is a horizontal sectional view on the same scale as Figure 4, the section being taken upon the line 5—5 of Figure 4, looking in the direction of the arrows;

Figure 6 is a perspective view of a toothed die washer employed in the joint structure; and Figure 7 is a perspective view of a ribbed and recessed washer employed in the joint structure.

While the invention is susceptible of a wide variety of uses, an illustrative embodiment is shown and will be described herein as utilized in a sectional table 1 of the kind shown and described in Letters Patent of the United States No. 2,327,743, granted to me on August 24, 1943, for Sectional Table.

The illustrative table 1 comprises three or more sections 2, 3 and 4. The several sections are essentially duplicates of one another. Each table section top is made up of a series of longitudinal sheet metal channel bars 5 which are connected to one another by transverse tie members 8, 9 and 10 in the form of sheet metal channel members. The tie members 9 are located intermediate the ends of a section and may be plain channel members, while the tie members 8 and 10 are located at opposite ends of a section, and are of special construction for use in securing the sections to one another. Each table section is provided with a non-metallic top member 11, and joint bars 12 are interposed between adjacent top members 11 and have their top surfaces flush with said members as described in the patent referred to.

The table legs desirably comprise sheet metal channel members 13, each having the upper end secured in one of the channel bars 8, 9, 10, and being braced or reinforced in any suitable manner. Each upper leg member 13 is adjustably connected with a lower member or shoe 14 which is fitted upon its lower end. Each shoe 14 comprises a central body web 15 and side webs 16, the latter webs including also marginal portions 17 which are folded inward to extend around the free margins of the channeled leg member 13. The lower end of the central body web 15 is folded inward to provide an attaching web 18. The web 18 is formed with a perforation 19 through which a screw may be passed for attaching the shoe 14 to a floor.

The channeled leg member 13 is formed in the central body web thereof with a longitudinal slot 20 through which the shank 21 of a headed bolt 22 is adapted to be freely passed. A nut 23 is adapted to be threaded upon the shank 21 of the bolt 22.

All of the illustrative structure as thus far described in detail is well known and forms per se no part of the present invention.

The web 15 of the shoe is formed with a perforation 24, in line with the slot 20, through which the shank 21 of the bolt 22 may be passed. The perforation 24 is desirably provided with side extensions 25.

The first die washer 26 is formed with a perforation 27 through which the shank 21 of the bolt 22 may be passed. Alongside the perforation 27 the washer includes projections or teeth 28 which are adapted to be inserted through the perforation extensions 25 of the web 15 and into engagement with wall material of the leg member 13 alongside the slot 20. Since the teeth 28 fit into the perforation extension 25 the washer 26 is held against rotation, as well as against bodily movement relative to the web 15 of the shoe.

A second die washer 29 is provided, the washer being formed with a perforation 30 through which the shank 21 of the bolt 22 may be passed. The washer is also formed with a rib 31 which is adapted to enter the slot 20 and to fit between the side walls of the slot, for holding the washer against rotation in properly oriented relation to the first washer. The washer 29 is further formed with perforated or recessed areas 32 in alignment with the perforation extensions 25 and with the washer teeth 28, when the washer 29 is impaled upon the bolt shank and the rib 31 is located in the slot 20.

With the parts thus assembled the nut 23 is screwed onto the bolt shank to force the washers 26 and 29 toward one another. As the nut is tightened the washer 29 is held against rotation by engagement of the rib 31 with the walls of the slot 20 and hence the recesses 32 are maintained in alignment with the teeth 28 of the washer 26. The teeth 28 force the wall material of the leg member 13 into the recesses 32, causing such material to be permanently deformed beyond its elastic limit.

When the operation is complete the washer 26 has its teeth passed through the web 15 of the shoe and fitted into recesses of the leg member 13. The leg member 13 has the deformed portions thereof fitted into recesses of the washer 29. Since the bolt fixes the relation of the washers 26 and 29, and the shoe 14 to one another, and the relation of the leg member 13 to the washer 29 is fixed, the leg member 13 and the shoe 14 are positively secured against relative longitudinal movement. The fact that the teeth 28 fit through the shoe 14 and into the indentations formed by the teeth in the member 13 also contributes to this result.

Should the table after a time be transferred to a new location, or should the table in the course of time become uneven through settling of the building structure or warping of the floor, the table top can be leveled up again by readjustment of the table legs. In readjusting a table leg the nut 23 is partially backed off and shoe 14 is shifted relative to the leg member 13 into the new relationship desired. The nut is again tightened on the bolt to again produce a positive interlock as previously described. Should the new deformation of the leg member 13 overlap the old, the die washers will act to even out and restore to their original condition the portions of the deformations which should no longer be maintained, at the same time displacing material of the leg member 13 in precisely the areas required to form the desired new deformation for effecting the interlock.

It is not essential that the recesses 32 extend completely through the washer 29, but such a construction is found to be convenient and economical to provide and is generally to be preferred.

The die washers 26 and 29 are desirably of substantially harder material than the sheet metal members 13 and 15 so that they may deform the sheet metal members without themselves suffering substantial deformation. The sheet metal members are commonly formed of soft steel, but may be formed of other metals, such as aluminum or its alloys, if desired. The washers are desirably composed of hardened steel or steel alloy. The die members are referred to as washers simply because the bolt passes through them. They may be of any convenient size and configuration desired.

I have described what I believe to be the best embodiments of my invention. I do not wish, however, to be confined to the embodiments shown, but what I desire to cover by Letters Patent is set forth in the appended claims.

I claim:

1. An adjustable joint comprising, in combination, a nut, a bolt, two sheet metal members to be joined, the first formed with an elongated longitudinal slot continuously wide enough to pass the shank of the bolt, and the second formed with a perforation having a central circular portion that passes the shank of the bolt and narrower aligned side extensions that overlie marginal wall material of the first member alongside the slot, a first die washer having a perforation adapted to pass and substantially to fit the bolt shank and having a projecting formation adapted to be passed through said perforation of the second member into engagement with marginal wall material of the first member alongside the slot thereof, and a second die washer having a rib adapted to fit into the slot, having a central perforation adapted to pass and substantially to fit the bolt shank, and having its body hollowed to provide a recessed area within the body and enclosed on at least three sides, the recessed area being disposed in alignment with the projecting formation of the first washer when the second washer is placed upon the bolt shank with the rib disposed in the slot, the projection of said first washer adapted to fit into and extend through the perforation of the second member and to engage and permanently deform marginal wall material of the first member, pressing it away from the second member and into the recessed area of the body of the second washer where it is shaped and locked in place by the surrounding washer body as pressure is exerted upon the washers by the bolt and nut.

2. An adjustable joint as set forth in claim 1 in which the die washers are formed of material substantially harder than the sheet metal of the members to be joined.

3. In an adjustable joint, the combination with a nut and bolt of two sheet metal members to be joined, the first member formed with an elongated longitudinal slot continuously wide enough to pass the shank of the bolt and the second member formed with a perforation having a central part that passes the shank of the bolt and narrower side extensions that overlie the slot margins, a first washer having a perforation adapted to pass and substantially to fit the bolt shank and having wedge-shaped teeth at opposite sides of said perforation adapted to be passed through the perforation extensions of the second member into engagement with the slot margins of the first member, and a second washer having a rib adapted to fit into the slot of the first member and having recesses formed in its body alongside the rib which overlie marginal material of the first member bounding the slot when the washer is placed upon the bolt shank with the rib disposed in the slot, the teeth of the first washer being adapted to fit into and extend through the perforation extensions of the second member and to engage and permanently deform marginal wall material of the first member, pressing it away from the second member and into the recesses formed in the body of the second washer where it is shaped and locked in place by the surrounding washer body as pressure is exerted upon the washers by the bolt and nut.

4. In an adjustable table leg, the combination with a nut and bolt of two slidably connected channel shaped sheet metal leg members to be locked against relative sliding, the first member formed with an elongated longitudinal slot continuously wide enough to pass the shank of the bolt, and the second member formed with a perforation having a central part that passes the shank of the bolt and narrower side extensions that overlie the slot margins, a first washer having a perforation adapted to pass and substantially to fit the bolt shank and having wedge-shaped teeth at opposite sides of said perforation adapted to be passed through the perforation extensions of the second member into engagement with the slot margins of the first member, and a second washer having a rib adapted to fit into the slot of the first member and having recesses formed in its body alongside the rib which overlie marginal material of the first member bounding the slot when the washer is placed upon the bolt shank with the rib disposed in the slot, the teeth of the first washer being adapted to fit into and extend through the perforation extensions of the second member and to engage and permanently deform marginal wall material of the first member, pressing it away from the second member and into the recesses formed in the body of the second washer where it is shaped and locked in place by the surrounding washer body as pressure is exerted upon the washers by the bolt and nut.

References Cited in the file of this patent

UNITED STATES PATENTS

| | | |
|---|---|---|
| 759,834 | Steele | May 10, 1904 |
| 2,374,743 | Granville | May 1, 1945 |